United States Patent [19]

Moen

[11] 3,991,917

[45] Nov. 16, 1976

[54] FLEXIBLE STEM VALVES SELECTIVELY ACTUABLE BY A COMMON OPERATOR

[76] Inventor: Lenard E. Moen, 7914 Michigan Ave., Whittier, Calif. 90602

[22] Filed: Dec. 5, 1975

[21] Appl. No.: 638,068

[52] U.S. Cl. ................................ 222/486; 222/504; 222/506; 222/518; 251/294

[51] Int. Cl.$^2$ ...................... B67D 3/00; F16K 31/00; B05C 1/00

[58] Field of Search ........... 222/484, 485, 486, 487, 222/510, 511, 515, 518, 506, 507, 504; 251/294; 137/595, 609; 118/255

[56] References Cited

UNITED STATES PATENTS

| | | | |
|---|---|---|---|
| 679,064 | 7/1901 | Stone | 222/485 |
| 2,631,613 | 3/1953 | Bergstrom | 251/294 X |
| 3,375,858 | 4/1968 | Jellies | 222/510 X |
| 3,416,710 | 12/1968 | Roubal | 222/518 X |
| 3,885,770 | 5/1975 | Houk | 251/294 |

*Primary Examiner*—Allen N. Knowles

*Attorney, Agent, or Firm*—Frederick E. Mueller

[57] ABSTRACT

One end of a resiliently flexible valve stem is supported in a coaxially aligned, axially adjustable, socket means and mounts a ball at its other end for normally closing the seat of an outlet orifice of a nozzle. A portion of the valve stem intermediate its ends is operatively associated with a laterally reciprocable operator bar for selectively effecting flexure of the valve stem to displace the valve ball on its seat to open the orifice to release a fluid to be dispensed through the nozzle. A plurality of such valve assemblies are actuable by a common operator bar and the adjustment means of each valve can be selectively manipulated to render one or more of the valves inoperable to establish a desired pattern of flow of fluids from the valves which remain operable, or to vary the time sequence of operation of the valves proportionally to the degree of adjustment of the individual valves, or to vary flow rates.

18 Claims, 7 Drawing Figures

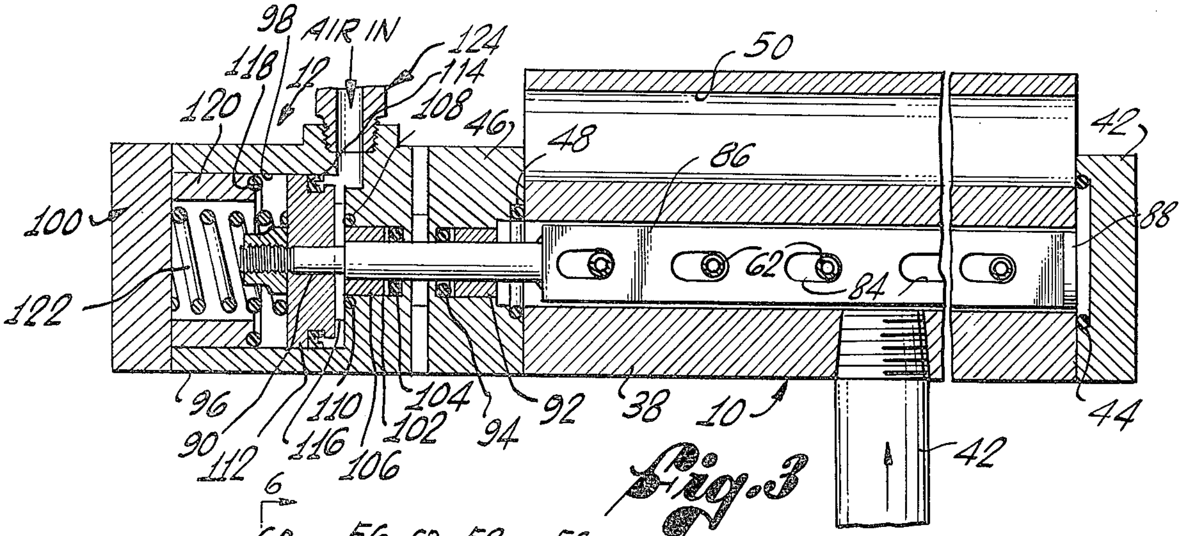
Fig. 3
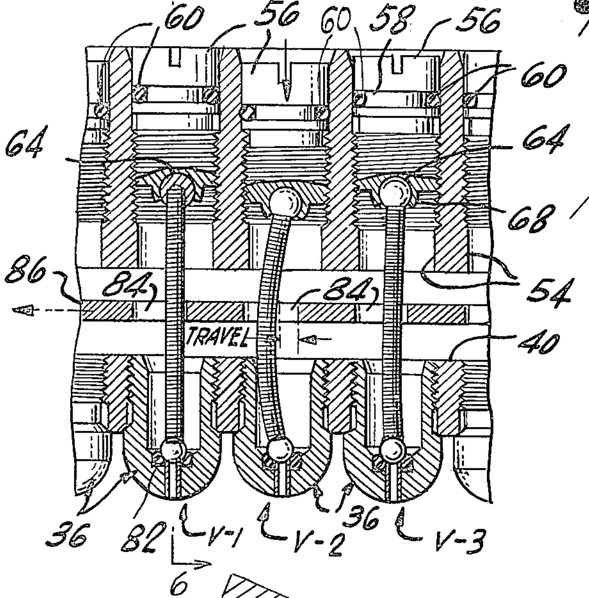
Fig. 4
Fig. 5
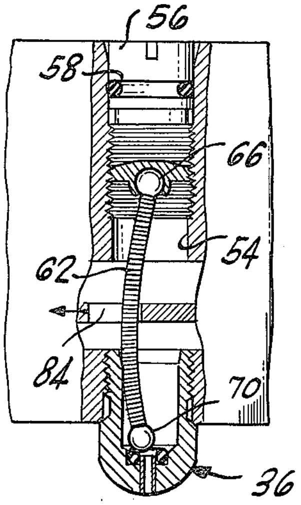
Fig. 6
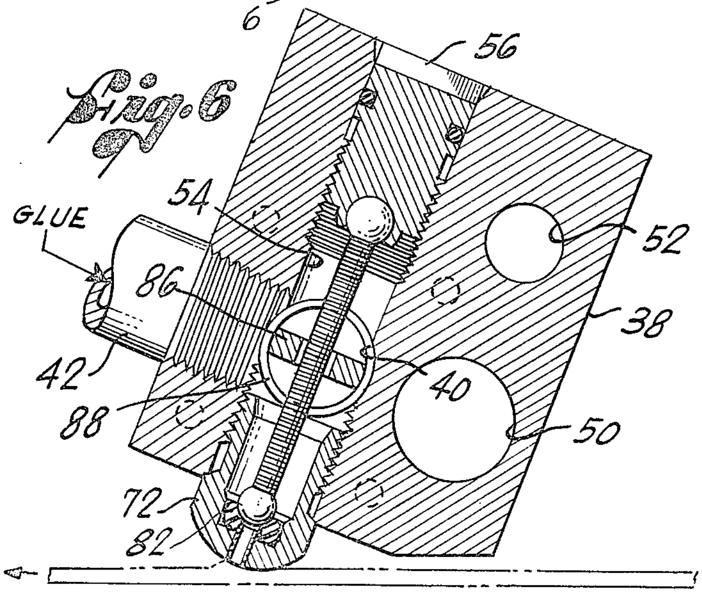
Fig. 7
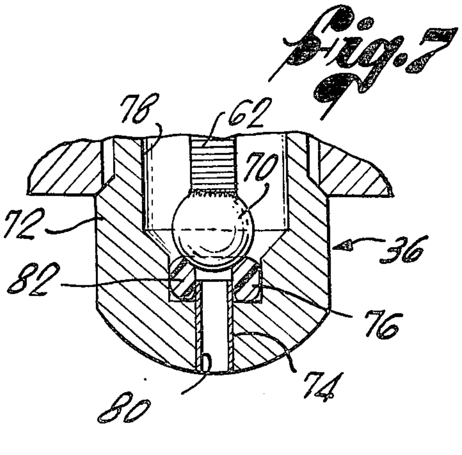

FLEXIBLE STEM VALVES SELECTIVELY ACTUABLE BY A COMMON OPERATOR

BACKGROUND OF THE INVENTION

The present invention relates generally to fluid dispenser valves.

The invention appears to be of special utility in the manufacture of cardboard or paperboard containers in applying hot melt adhesives to the various flaps or other surfaces thereof. Accordingly, the invention will be described with particular reference to such application but without implying limitation to any particular type of fluid or work surface.

In the manufacture of paperboard cartons, it is frequently desirable to apply a plurality of glue beads or stripes to a flap, for example, of the container or carton blank. For this purpose a variety of devices have heretofore been devised. Some of these, for example, Walker et al U.S. Pat. No. 3,088,433 and Fox U.S. Pat. No. 3,126,574, merely provide a plurality of parallel spaced outlet nozzles with a common manifold under the control of a single valve element, no one of the individual outlet orifices being individually adjustable or capable of being rendered inoperable. Other devices, for example, Blair U.S. Pat. No. 3,508,849, Craig U.S. Pat. No. 3,190,259, Ziemba U.S. Pat. No. 3,286,689, Lockwood U.S. Pat. No. 3,348,520 and Guthrie U.S. Pat. No. 3,420,208, disclose a variety of multiple nozzle glue guns having outlet orifices individual ones of which can be rendered inoperable in order to achieve a desired pattern of a desired number of glue stripes or the like. However, the prior devices are relatively complex, expensive and cumbersome in use, particularly in effecting changes from one glue pattern to another.

The present invention provides a simplified, relatively inexpensive, normally closed valve structure, comprising a simple assembly of readily replaceable parts, that is readily externally adjustable to alter the open time of the valve or the flow rate of the fluid to be discharged through the outlet orifice, or to render the valve inoperable.

The invention also provides a durable, yet inexpensive, ball valve seat structure that is extremely well adapted to withstand high temperature, high pressure usage.

The invention further provides a multiple nozzle glue gun with individual valve elements having flexible stems actuable by a common operator, each of the valve elements having individually adjustable means to render selected ones of the valve inoperable for achieving a desired pattern of plurality of glue stripes with the other operable valves. Further, the pattern is variable, not only with respect to the number of the array of nozzles remaining in actuable condition but, also, in a manner to vary the time sequence of operation of the valves so that, for example, one of the nozzles will delivery a shorter bead or stripe of glue then an adjacent nozzle. In yet another mode of adjustment of the multiple nozzle fluid dispenser of this invention, the flow rate of one or all of the nozzles can be adjusted readily.

A full understanding of the invention, and of its further objects and advantages, will be had from the following description of a presently preferred embodiment thereof. It will be understood that this description, and the accompanying drawings which form part of it, are intended only as illustrative and not as a limitation upon the scope of the invention.

BRIEF DESCRIPTION OF THE DRAWINGS

FIG. 3 is a partial horizontal sectional view taken on the line 3—3 of FIG. 2.

FIG. 4 is a partial, vertical sectional view through the axes of a parallel array of some of the valves of the multiple nozzle glue gun of FIG. 1, taken on the line 4—4 of FIG. 1.

FIG. 5 is a view similar to FIG. 4 of the one only of the valve structures, illustrating the open condition.

FIG. 6 is a transverse sectional view of the assembly taken on the line 6—6 of FIG. 4.

FIG. 7 is a partial sectional view, on a larger scale, of the valve seat and nozzle structure of one of the valve assemblies of the multiple nozzle glue gun.

DESCRIPTION OF THE PREFERRED EMBODIMENT

Figure 1:
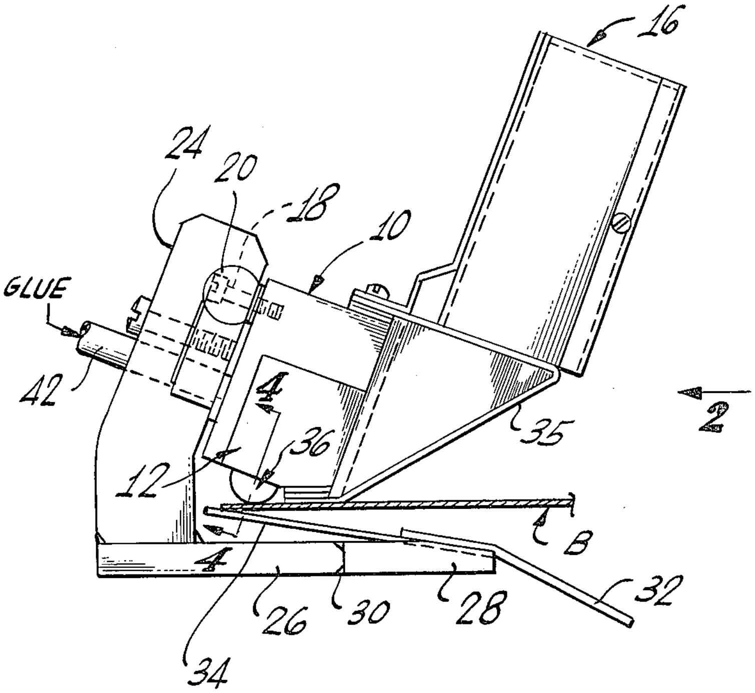
FIG. 1 is an end elevation of a multiple nozzle glue gun embodying the invention.
Figure 2:
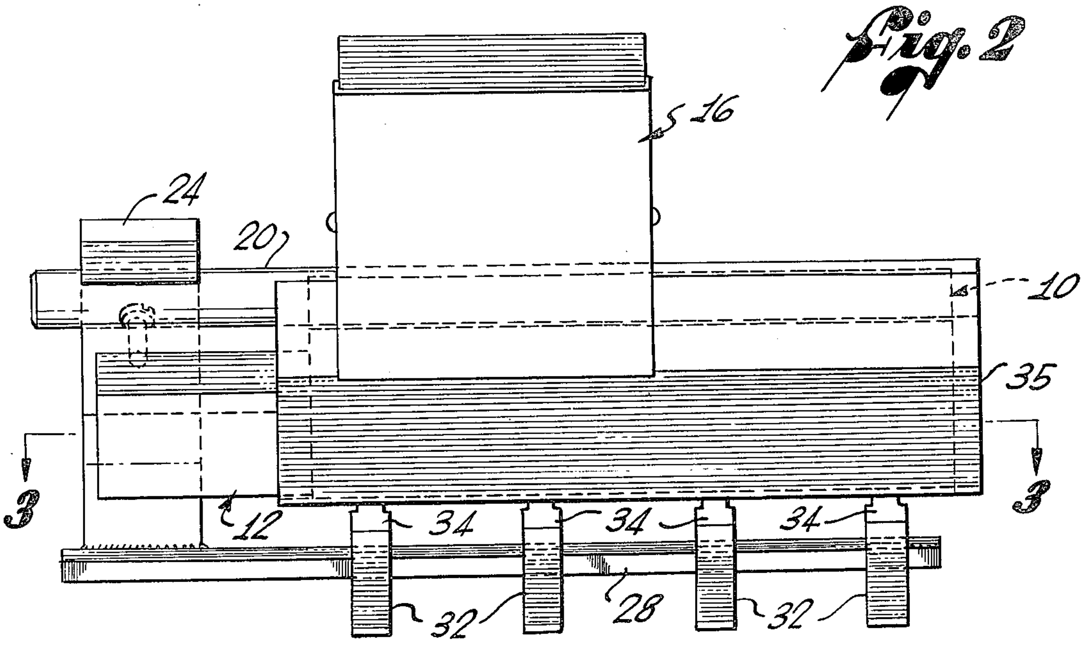
FIG. 2 is a rear-side elevational view taken in the direction of the arrow 2 of FIG. 1

The general arrangement of a multiple glue gun embodying the invention is shown in FIGS. 1 and 2, as adapted for applying a multiplicity of stripes of high pressure hot melt glue to the upper surface of a section of corrugated paperboard blank B, as in making containers More specifically, an elongate valve housing 10 is provided at one end with a pneumatic operating cylinder 12 that is operatively associated with and controlled by conventional means contained within a box 16 connected on top of the housing 10. The parts are joined in a common assembly adapted to be secured, as by fastener means 18, to a horizontally disposed rod 20 that is clamped at one end to an upright post 24 of a mounting bracket having a horizontal flange 26 to be secured to one side of the box making machinery.

One end of an elongate entrance bar 28 is rigidly secured, as by welding 30, to the upstream end of the horizontal flange 26 to extend inwardly therefrom in vertically spaced parallel relationship to the body 10. The bar 28 is fitted with a spaced apart plurality of entrance shoes 32 along its length and each of shoes 32 is fitted at its downstream or exit end with a spring finger 34. As is shown in FIG. 1, the orientation of the entrance shoes 32 and spring fingers 34 is such as to guide a box blank B beneath an overhead, elongate shoe 35 of the housing 10 to bring the upper surface of the material into contact with a plurality of glue nozzles, generally designated at 36, protruding beneath the housing.

The valve housing 10 includes a body 38 that is formed with a longitudinally extending through bore 40 that has fluid communication, via a fitting 42, with a pressurized source of hot melt adhesive. The bore 40 is essentially a fluid-tight manifold for the supply of adhesive to all of the nozzles 36 and is closed, at the inner end of the housing 10, by an end cap 42 internally mounting a seal ring 44. At the other end of the valve housing 10, the manifold bore 40 is closed by a pneumatic cylinder mounting block 46 that, also, encloses a seal ring 48.

In order to maintain the hot melt adhesive passing through the device at the desired temperature, the body 38 is formed with a first longitudinally extending bore 50 to mount an electrical heating means and a second longitudinally extending bore 52 for the reception of a thermostatic control means.

For mounting a plurality of valves, the body 38 is formed with a plurality of vertically extending parallel through bores 54 all of whose axes intercept the axis of the longitudinally and horizontally extending manifold bore 40. Each of the valve mounting bores 54 has a pair of threaded portions on opposite sides of the manifold bore 40 for receiving a nozzle assembly 36 in its lower end and a valve adjustment means in its upper end.

Each valve adjusting means comprises an externally threaded adjusting screw 56 having a head portion that is peripherally formed with an annular groove 58 for the reception of an O-ring fluid seal 60. The inner or lower end face of each adjustment screw 56 centrally mounts one end of a flexible valve stem 62. Preferably, the connection takes the form of a ball socket 64 formed in the inner end face of the adjustment screw to swivelly receive a ball 66, as indicated at 68.

Each flexible stem 62 preferably takes the form of layers of oppositely helically wound wire, e.g., A.C. speedometer cable No. 615, so as to be essentially resiliently flexible. At its lower end each stem 62 has a valve ball 70 soldered thereto for opening and closing the associated nozzle assembly 36 upon transient lateral deflection of the valve stem 62.

Each of the nozzle assemblies 36 comprises an externally threaded tubular member 72 that is step-drilled and counterbored to internally define an outlet orifice 74, an annular shoulder 76, and an enlarged diameter internal passage 78 that is in fluid communication at its upper end with the manifold bore 40. A tubular metallic sleeve 80 is fitted in the orifice bore 74 preferably with a press fit. In any event, the arrangement is preferably such that the inner end of the sleeve 80 projects inwardly beyond the radial face of the shoulder 76, defining an annulus between the external surface of the sleeve and the surrounding cylindrical surface of the shoulder 76 for the reception of an elastomeric O-ring seal 82 serving as a seat for the ball valve element 70. As is clearly shown in FIG. 7, the relationship of the parts is preferably such that the radial dimension of the annulus is less then the relaxed normal radial cross-section of the O-ring 82, whereby the deformation in radial cross-section depicted in FIG. 7 of the O-ring seal seat 82 is maintained. This arrangement is very effective in internally reinforcing the O-ring seat against collapsing, preventing leakage at the external surface of the ring seal, in providing a reliable seat on which the ball valve 70 can be displaced and replaced in and out of its normally closed condition, and preventing extrusion of the O-ring through the nozzle.

For opening and closing the valves the manifold bore 40 mounts an operator bar 86, having valve stem surrounding slots 84, of a width to be freely reciprocable within the bore. At its inner end, i.e., the right end as viewed in FIG. 3, the operator bar 86 is secured to a guide ring 88 having axially slidable engagement with the wall of the bore 40. At its other end, the operator bar 86 is connected to one end of a piston rod 90 that is held in coaxial alignment with the guide ring 88 and the bore 40 by a hearing 92 fitted within the central bore of the pneumatic cylinder mounting block 46, adjacent to an O-ring seal 94. With this arrangement the operator bar 86, which is of non-circular cross section to be keyed against turning, is constrained for free axial reciprocation along the axis of the manifold 40, to effect deflection of valve stems 62 by inner ends of the slots 84 of the single operator.

The pneumatic cylinder assembly 12 comprises a body 96 having a piston chamber 98, with one end closed by an end cap 100. The other end of the piston chamber is closed by an end wall of the block 96 that is formed with a through bore 102 fitted with an O-ring seal 104 and a bearing 106 slideably embracing the piston rod 90. At its junction with the piston chamber 98, the through bore 102 defines an annular shoulder 108 for seating a piston retraction cushion 110, which may take the form of an elastomeric O-ring.

The piston rod 90 is fitted with a piston 112 that carries a piston ring 114 and, on that side facing the retraction cushion 110, also carries a thrust washer 116. In somewhat similar fashion, the extension stroke of the piston is cushioned by an O-ring cushion 118 mounted in one end of a cylindrical piston spacer 120 abuts the end cap 100. The piston 112 and operator bar 86 are normally held in a retracted position, in which the valves are fully closed, by means of a coil spring 122 interposed between the end cap 100 and the opposing face of the piston 112.

While not illustrated in detail it will be understood that the pneumatic control system contained within the housing 16 contains a solenoid controlled valve, or the like, for alternately connecting the piston chamber 98 to a source of compressed air or venting to atmosphere, via a fitting 124. It will also be understood that the parts of the pneumatic power cylinder are sized, between the cushions 110 and 118, to produce a desired stroke amplitude, of the operator bar 86, depicted by the "Travel" gap of FIG. 4.

FIG. 4 illustrates three of the identical valve assemblies, identified for convenience of reference as V-1, V-2 and V-3, in three different conditions of adjustment. As the operator bar 86 is in the retracted position, i.e., corresponding to the position of the piston 112 illustrated in FIG. 3, all of the valves V-1, V-2 and V-3 are in a fully closed condition. However, upon an extension stroke of the operator bar 86 the valve V-1 will open, the valve V-2 will remain closed and the valve V-3 will open later than and close earlier than the valve V-1.

More specifically, the valve V-1 is adjusted axially inwardly to exert only a relatively slight compressive force on its stem 62 between the adjustment screw 56 and the seat member 82, the stem 62 remaining essentially straight. By contrast, the adjustment screw 56 of the valve V-2 is farther axially inwardly adjusted to produce an extremely bowed condition of its stem 62. As is illustrated in FIG. 4, the extent of arcing of the stem of the valve V-2 is such as to displace that intermediate portion lying within the plane included by the operator bar 86 out of the range of the extension stroke of the operator bar, such stroke being indicated by the gap indicated at "travel". The valve V-3 has its adjusting screw 56 turned inwardly to a position intermediate the positions of the adjustment screws of the valves V-1 and V-2, sufficiently to bow the valve stem 62 of the valve V-3 out of a straight condition but with the stem's intermediate section, within the "Travel" stroke range of the operator bar.

FIG. 5 illustrates the relative condition of the parts of a valve, e.g., the valve V-1, in open condition. As will now be apparent, when pressure in the pneumatic cylinder 12 is released the operator bar 86 will return to fully retracted position whereupon the valve stem 62, which was resiliently stressed into the bowed condition, concurrently returns to an essentially straight, or substantially so, position to return the valve ball 70 into orifice blocking position. It has been found that by employing a highly resilient member as the valve stem, such as the automotive cable previously identified, an extremely quick and highly positive valve closing action is achieved.

Each of the valves is provided with some means of externally indicating the condition of that valves adjustment. For example, each of the adjusting screws 56 may be provided with a radial mark which is angularly moveable relative to another radially disposed mark on the housing at the edge of the valve bore 54. Thus, the parts may be dimensioned with a thread pitch so that, with reference to FIG. 4, a fully operable valve V-1 has its adjusting screw 56 flush with the upper face of the valve body, with the two indicator marks in registration with one another; the adjusting screw 56 of the valve V-2 may have its indicator mark turned 300° relative to the base mark of its valve bore; and the adjusting screw 56 of the valve V-3 may have its indicator mark advanced on the order of 100° relative to its base mark. As a result, the corresponding valve stems of the three valves V-1, V-2 and V-3 are differently axially compressed with their corresponding valve balls 70 remaining seated in the closed conditions illustrated in FIG. 4 but, upon actuation of the common operator bar 86, the valve V-1 will open immediately, the valve V-2 will remain closed, and the valve V-3 will open and close out of phase relative to the valve V-1, as previously stated.

The valving elements, i.e., the depicted ball 70 and deformed elastomeric O-ring 86, may of course take other forms. However, in any event the valve seat and valve element should have cooperating shape characteristics such that upon an extension stroke of the operator bar 86 active ones of the valves will open in such a manner that the valve element remains in contact with the valve seat, although displaced from the corresponding orifice so as to permit fluid flow therethrough. Upon retraction of the operator bar 86, i.e., in valve closing direction, the valve seat and valve element shape characteristics are such that the valve element is cammed to the closed position, blocking the outlet orifice.

Finally flow rates of individual ones of the valves may be changed by appropriate axial adjustment of the corresponding adjustment screw 56. Flow rate adjustment appears to be a non-linear function of the extent to which a particular valve stem 62 is compressively stressed by its adjusting screw 56 out of an essentially linear condition. Thus, when a valve stem 62 is relatively slightly bowed, as for example the valve v-3, there does not appear to be any significant change in flow rate as compared to the valve V-1, in which the valve stem remains essentially linear. However, as a valve stem is more radically bowed, as within a range of the "Travel" gap just short of rendering the valve totally inactive, the flow rate is altered.

I claim:

1. A valve comprising:

a valve body having a fluid inlet and a fluid outlet, said outlet being formed with a valve seat;

a valve stem holder positioned in said body in spaced relationship to said valve seat;

a valve stem comprising a finite length of laterally flexible material in said body that normally extends between said valve seat and said stem holder;

said stem being connected at one end to said stem holder and having a valve element at the other end of said stem normally engaging said seat to close said outlet:

and operator means in said body engageable with said stem to laterally flex said stem, said valve element and said valve seat having shape characteristics to translate flexure of said stem into displacement of said valve element relative to said outlet for opening said valve.

2. A valve as defined in claim 1 in which the material of said valve stem is also resilient, said valve element and said valve seat having shape characteristics to translate release of said stem by said operator means into replacement of said valve element relative to said outlet for closing said valve.

3. A valve as defined in claim 1 in which said stem is pivotally connected at said one end to said stem holder.

4. A valve as in claim 3 in which said stem is swivelly connected to said stem holder by a slidably related ball and socket means.

5. A valve as defined in claim 1 including a means comprising said valve seat and said stem holder to vary the spacing therebetween for adjustment of said stem between essentially linear and flexed configurations while said valve element is in normally closed engagement with said seat.

6. A valve as defined in claim 1 in which said seat comprises a ring of an elastomeric material encircling said outlet and in which said outlet includes a rigid orifice means within said ring to radially outwardly compress said ring into fluid sealing engagement with a surrounding wall surface.

7. A valve as defined in claim 6 in which said valve element comprises a ball and in which said rigid orifice means comprises a tubular metallic liner for said outlet.

8. A multiple nozzle fluid dispenser comprising:

a body with a plurality of valves having outlet nozzles, each of said valves having a laterally flexible stem with a valve element at one end for opening and closing the corresponding one of said nozzles, and operator means in said body for laterally flexing all of said stems in common.

9. A dispenser as defined in claim 8 in which said operator means comprises a single rigid member that is, at least unidirectionally, engageable with said stems upon a movement of said member.

10. A dispenser as defined in claim 8 in which each of said valves has adjustment means for flexing its associated stem independently of actuation of said operator means in order to vary the degree or degrees of response of a stem or stems to a cycle of operation of said operator means.

11. A dispenser as in claim 10 in which each of said valves has a stem holder positioned in spaced relationship to a seat for said valve element and connected to the other end of said stem.

12. A dispenser as defined in claim 11 in which said valve element and said valve seat of each of said valves have shape characteristics to translate flexure of said stem by said operator means into displacement of said valve element relative to the seat for opening and closing the valve.

13. A dispenser as in claim 12 in which each of said stems comprises a length of a resilient material.

14. A dispenser as defined in claim 10 in which said ajustment means includes a stem holder connected to the other end of the corresponding one of said stems.

15. A dispenser as defined in claim 10 in which said operator means has a fixed amplitude of operation for flexing said stems and in which each of said adjustment means has a range for flexing said stem to a degree at least as great as the range of said operator means.

16. A dispenser as defined in claim 15 in which said adjustment means comprises a valve seat and a stem holder that are relatively moveable to vary the spacing therebetween for adjustment of said stem between essentially linear and flexed configurations while said valve element is in normally closed engagement with said seat.

17. A dispenser as defined in claim 15 in which said operator means comprises an elongate rigid bar having a longitudinal slot formed therein for each of said stems, each of said slots having sufficient length to accomodate flexure of a stem induced by the corresponding adjustment means.

18. A dispenser as defined in claim 10 in which said operator means comprises an elongate rigid bar mounted in said body for reciprocation along its longitudinal axis and in which said valves are oriented in parallel in a plane intersecting the axis of reciprocation of said bar.

* * * * *